United States Patent
Kishimoto et al.

(10) Patent No.: US 6,451,720 B1
(45) Date of Patent: *Sep. 17, 2002

(54) GLASS COMPOSITION, AND INFORMATION RECORDING MEDIUM SUBSTRATE, INFORMATION RECORDING MEDIUM, AND INFORMATION RECORDING DEVICE EACH COMPRISING THE COMPOSITION

(75) Inventors: Shoichi Kishimoto; Akihiro Koyama; Hiroyuki Tanaka, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 30 days.

This patent is subject to a terminal disclaimer.

(21) Appl. No.: 09/690,756

(22) Filed: Oct. 18, 2000

(30) Foreign Application Priority Data

Oct. 19, 1999  (JP) .......................................... 11-296448

(51) Int. Cl.$^7$ ...................... C03C 3/062; C03C 3/085; C03C 3/087; C03C 3/095; B32B 17/00
(52) U.S. Cl. ........................... 501/64; 501/69; 501/70; 501/73; 428/64.3; 428/65.6; 428/410
(58) Field of Search ............................... 501/64, 69, 70, 501/72, 73; 428/64.3, 64.4, 65.3, 65.6, 410, 426, 428, 689

(56) References Cited

U.S. PATENT DOCUMENTS 3,785,836 A * 1/1974 Bacon et al.
5,981,015 A * 11/1999 Zou et al. .................. 428/64.2
5,997,977 A * 12/1999 Zou et al. .................. 428/64.1
6,162,751 A * 12/2000 Speit et al. ..................... 501/73
6,214,429 B1 * 4/2001 Zou et al. .................. 428/64.1
6,306,786 B1 * 10/2001 Koyama et al. ............... 501/69
6,376,403 B1 * 4/2002 Koyama et al. ............ 428/410

FOREIGN PATENT DOCUMENTS

JP         11302031 A    * 11/1999

* cited by examiner

*Primary Examiner*—David Sample
(74) *Attorney, Agent, or Firm*—Sughrue Mion, PLLC

(57) ABSTRACT

A glass composition is disclosed which has a high modulus of elasticity and a low density, i.e., has a high specific modulus. Also disclosed is an inexpensive glass composition which is suitable for use as an information recording medium substrate, for example, because it can be formed easily, is less apt to suffer devitrification, is suitable for mass production, and can be easily made to have high surface smoothness by polishing. The glass compositions comprise, in terms of mol %, 35 to 45% silicon dioxide ($SiO_2$), 15 to 20% aluminum oxide ($Al_2O_3$), 3 to 10% lithium oxide ($Li_2O$), 0.1 to 5% sodium oxide ($Na_2O$), 15 to 30% magnesium oxide (MgO), 0 to 10% calcium oxide (CaO), 0 to 4% strontium oxide (SrO), 25 to 35% RO (MgO+CaO+SrO), 2 to 10% titanium dioxide ($TiO_2$), 0.5 to 4% zirconium oxide ($ZrO_2$), 4 to 12% $TiO_2+ZrO_2$, and 0 to 4% yttrium oxide ($Y_2O_3$).

20 Claims, No Drawings

GLASS COMPOSITION, AND INFORMATION RECORDING MEDIUM SUBSTRATE, INFORMATION RECORDING MEDIUM, AND INFORMATION RECORDING DEVICE EACH COMPRISING THE COMPOSITION

FIELD OF THE INVENTION

The present invention relates to a glass composition having a high modulus of elasticity, more particularly a glass composition which is suitable for use as an information recording medium substrate required to have high surface smoothness and a high modulus of elasticity. The invention further relates to an information recording medium substrate, an information recording medium, and an information recording device each comprising the glass composition.

BACKGROUND OF THE INVENTION

A larger recording capacity and a shorter access time are required to information recording devices such as hard disks. One possible way to realize the latter requirement is to rev up the spinning speed of an information recording medium (hereinafter referred to as "recording medium" for simplicity)

However, since substrates for information recording media (hereinafter referred to simply as "substrates") have a slight distortion by their own weight, the distortion makes substrates resonate considerably when a higher spinning speed is employed. Such a vibrational resonance causes a fatal crash of recording media by a collision between the medium and a magnetic head. This is the reason why the narrow gap between a magnetic head and a recording medium cannot be employed, and this prevents information recording devices from decreasing their recording capacity.

In order to reduce the bending and resonance of substrates, we should use substrates whose modulus of elasticity (Young's modulus) is higher than that of conventional substrates. The commercial substrates made of an aluminum alloy, whose modulus of elasticity is 71 GPa, cannot cope with high rotational speeds of 10,000 rpm and above. Although there is a need to use thinner substrate for device miniaturization, aluminum substrates need to have a larger thickness so as to compensate for the deficiency in modulus of elasticity. Glass substrates made of chemically tempered soda-lime glass are also commercially available. However, Young's modulus of this substrate is only 72 GPa and there is the same drawback as the aluminum substrates.

JP-A-10-81542 (the term "JP-A" as used herein means an "unexamined published Japanese patent application") discloses a glass which is based on $SiO_2$—$Al_2O_3$—RO (wherein R is a bivalent metal) and contains at least 20 mol % $Al_2O_3$ or MgO and from 0.5 to 17 mol % $Y_2O_3$, as a glass free from the drawback described above. JP-A-10-81540 discloses a glass having a glass transition point of 750° C. or higher and a glass containing a rare-earth oxide such as $Y_2O_3$, $Nd_2O_3$, $Gd_2O_3$, $Ho_2O_3$, or $La_2O_3$ in an amount or 18 mol % or larger, while JP-A-10-79122 discloses a glass based on $SiO_2$—$Al_2O_3$—RO (wherein R is a bivalent metal) and containing $TiO_2$, $ZrO_2$, $Y_2O_3$, or the like. International Publication WO 98/55993 discloses various glasses having a modulus of elasticity as represented by Young's modulus of 100 GPa or higher and a density of 3.5 $g·cm^{-3}$ or lower. Furthermore, International Publication WO 98/09922 discloses a glass in which the specific modulus as determined by dividing the modulus of elasticity represented by Young's modulus by the density is 36 $GPa·g^{-1}·cm^3$ or higher.

However, since most of the glasses shown in the Examples given in the references cited above contain no alkali ingredients, they cannot be tempered by ion exchange and, hence, they do not have a sufficient breaking strength. Although glasses containing an alkali ingredient are described therein, most of these have a Young's modulus as low as below 110 GPa and the remaining glasses, having a Young's modulus of 110 GPa or higher, have a density as high as 3.1 $g·cm^{-3}$ or above. These glasses have a specific modulus lower than 39.0 $GPa·g^{-1}·cm^3$. When such glasses are used as substrates, they bend considerably at a high rotational speed, or impose an excessive load on the drive. Specific modulus is the value obtained by dividing modulus of elasticity represented by Young's modulus by density. Another drawback of those glasses is that since they contain any of $Al_2O_3$, MgO, CaO, $TiO_2$, and $ZrO_2$ in an excessively large amount, they easily devitrificates during glass production and, hence, it is hard to obtain a homogeneous glass.

It is inevitable that information recording devices will come to be more strongly required to attain a larger recording capacity, a shorter access time, etc. However, any of the conventional substrates cannot sufficiently meet these requirements.

SUMMARY OF THE INVENTION

The invention has been achieved in view of the above-described problems of conventional techniques.

One object of the invention is to provide a glass composition which has a high modulus of elasticity and a low density, i.e., has a high specific modulus.

Another object of the invention is to provide at low cost a glass composition which is suitable for use as an information recording medium substrate, for example, because it can be formed easily, is less apt to devitrificate, is suitable for mass production, and can be easily made to have high surface smoothness by polishing.

Still another object of the invention is to use this, glass composition to provide a substrate and a recording medium each contributing to an increase in recording density and a reduction in access time in information recording devices to thereby contribute to further progress in an information-oriented society.

These objects are accomplished with a glass composition comprising, in terms of mol %, 35 to 45% silicon dioxide ($SiO_2$), 15 to 20% aluminum oxide ($Al_2O_3$), 3 to 10% lithium oxide ($Li_2O$), 0.1 to 5% sodium oxide ($Na_2O$), 15 to 30% magnesium oxide (MgO), 0 to 10% calcium oxide (CaO), 0 to 4% strontium oxide (SrO), 25 to 35% RO (MgO+CaO+SrO), 2 to 10% titanium dioxide ($TiO_2$), 0.5 to 4% zirconium oxide ($ZrO_2$), 4 to 12% $TiO_2$+$ZrO_2$, and 0 to 4% yttrium oxide ($Y_2O_3$).

The invention further provides a glass composition comprising, in terms of mol %, 35 to 42% silicon dioxide ($SiO_2$), 15 to 20% aluminum oxide ($Al_2O_3$), 5 to 10% lithium oxide ($Li_2O$), 0.1 to 2% sodium oxide ($Na_2O$), 20 to 30% magnesium oxide (MgO), 0 to 10% calcium oxide (CaO), 0 to 4% strontium oxide (SrO), 25 to 35% RO (MgO+CaO+SrO), 5 to 10% titanium dioxide ($TiO_2$), 1 to 4% zirconium oxide ($ZrO_2$), 6 to 12% $TiO_2$ +$ZrO_2$, and 0 to 4% yttrium oxide ($Y_2O_3$).

The invention furthermore provides a glass composition comprising, in terms of mol %, 35 to 40% silicon dioxide ($SiO_2$), 15 to 20% aluminum oxide ($Al_2O_3$), 3 to 10% lithium oxide ($Li_2O$), 0.1 to 5% sodium oxide ($Na_2O$), 15 to 30% magnesium oxide (MgO), 0 to 10% calcium oxide (CaO), 0 to 4% strontium oxide (SrO), 25 to 35% RO (MgO+CaO+SrO), 2 to 10% titanium dioxide (TiO$_2$), 1 to 4% zirconium oxide (ZrO$_2$), 4 to 12% TiO$_2$+ZrO$_2$, and 0 to 4% yttrium oxide (Y$_2$O$_3$).

In a preferred embodiment of the glass compositions of the invention described above, the ratio of the content of Li$_2$O to that of (Li$_2$O+Na$_2$O) is from 0.76 to 0.99.

In another preferred embodiment of the glass compositions of the invention described above, the ratio of the content of MgO to that of (MgO+CaO+SrO) is from 0.76 to 1.00.

In still another preferred embodiment of the glass compositions of the invention described above, the ratio of the content of Al$_2$O$_3$ to that of (Li$_2$O+Na$_2$O) is from 1.5 to 4.0.

The invention still further provides a glass composition which has a modulus of elasticity as represented by Young's modulus of 110 GPa or higher and a density lower than 3.1 g/cm$^3$ and in which the specific modulus G as determined by dividing the modulus of elasticity by the density thereof satisfies the following relationship (1).

$$G \geq 9.36 \left\{ \sum_i u_i x_i / d_i \right\} \cdot \left\{ \sum_i v_i x_i \right\} / \left\{ \sum_i w_i x_i \right\} \tag{1}$$

A further preferred embodiment of the glass compositions of the invention described above is one which has a modulus of elasticity as represented by Young's modulus of 110 GPa or higher and a density lower than 3.1 g/cm$^3$ and in which the specific modulus G as determined by dividing the modulus of elasticity by the density thereof is 39.0 GPa·g$^{-1}$ cm$^3$ or higher.

Still a further preferred embodiment of the glass compositions of the invention described above is one which has undergone an ion-exchange treatment in a molten salt containing at least either of potassium ions and sodium ions.

The invention still further provides a substrate for information recording media which comprises any of the glass compositions described above.

The invention still further provides an information recording medium employing the substrate for information recording media described above.

The invention still further provides an information recording device employing the information recording medium described above.

DETAILED DESCRIPTION OF THE INVENTION

Modes for carrying out the invention will be explained in below in detail. Hereinafter, all percents are by mol, and "modulus of elasticity" means Young's modulus and "specific modulus" means the value obtained by dividing the modulus of elasticity representing Young's modulus by density.

The present inventors made intensive investigations on the relationship among composition, modulus of elasticity, and specific gravity in oxide glasses. As a result, they have succeeded in developing a glass composition having a modulus of elasticity of 110 GPa or higher, a density lower than 3.1 g·cm$^{-3}$, and a specific modulus of 39.0 GPa·g$^{-1}$·cm$^3$ or higher by adding suitable amounts of TiO$_2$ and ZrO$_2$ to a glass composition comprising SiO$_2$, Al$_2$O$_3$, Li$_2$O, Na$_2$O, and MgO as essential components. Each component of the glass composition is contained in an amount within the range shown below and performs its functions.

SiO$_2$ is an essential component constituting the network structure of the glass. The silica glass consisting of SiO$_2$ alone has a modulus of elasticity of about 70 GPa; therefore as the content of SiO$_2$ increases, the modulus of elasticity approaches that value. Consequently, in order to improve modulus of elasticity of the glass, there is an upper limit in SiO$_2$ content. Contents of SiO$_2$ not higher than 45% result in a modulus of elasticity of 110 GPa or higher. When a substrate made of a glass composition having a modulus of elasticity of 110 GPa or higher is used, an information recording device is obtained which stably works at a magnetic head/recording medium gap (flying height) of 15 nm and a rotational speed of 10,000 rpm or higher. In the case where the SiO$_2$ content is 40% or lower, a modulus of elasticity of 110 GPa or higher is obtained more surely.

Even in the case where the SiO$_2$ content is higher than 40% but not higher than 42%, a modulus of elasticity almost the same as in the case where the SiO$_2$ content is 40% or lower can be attained by regulating the contents of the other components. From the standpoint of glass formability, the upper limit of SiO$_2$ content is preferably high because the viscosity of a glass melt fluctuates depending on the SiO$_2$ content thereof. In the case where the SiO$_2$ content is 42% or lower, it is preferred to heighten the contents of Li$_2$O, MgO, and TiO$_2$, which each increases the modulus of elasticity, and to lower the content of Na$_2$O, which less contributes to an improvement in modulus of elasticity.

On the other hand, too low SiO$_2$ contents make glass formation impossible. Consequently, the lower limit of SiO$_2$ content should be within a range where glass formation is possible. By regulating the contents of components other than SiO$_2$ to respective values within the ranges which will be given later, an SiO$_2$ content of 35% or higher can be attained. Consequently, the content of SiO$_2$ in the glass composition of the invention should be from 35 to 45%, and is preferably from 35 to 42%, more preferably from 35 to 40%.

Al$_2$O$_3$ is an essential component which improves the modulus of elasticity and water resistance of the glass composition and increases the thickness of a compression stress layer formed by ion exchange. In case where the content of Al$_2$O$_3$ is lower than 15%, these effects are insufficient. On the other hand, contents thereof exceeding 20% result in impaired meltability. In this case, however long a batch is heated, complete melting may be impossible. Even when the batch has melted completely, this composition is highly susceptible to devitrification upon cooling/solidification and glass formation is difficult. Consequently, the content of Al$_2$O$_3$ in the glass composition should be from 15 to 20%. The term "batch" means a mixture prepared by mixing raw glass materials together in such a proportion as to result in a glass made up of components contained in respective given amounts.

In case where the proportion of Al$_2$O$_3$ to all alkali ingredients (Li$_2$O+Na$_2$O) is smaller than 1.5, the glass is apt to be not transparent but milk-white. On the other hand, in case where that proportion exceeds 4.0, the glass is highly apt to devitrificate. Consequently, Al$_2$O$_3$/(Li$_2$O+Na$_2$O) is preferably from 1.5 to 4.0.

Li$_2$O is an essential component which effectively improves the modulus of elasticity of the glass composition and undergoes ion replacement in ion exchange conducted for strengthening. It serves also to lower the melting temperature of the glass and thus enhance meltability. Li$_2$O is thought to further serve to increase the rate of polishing for obtaining a mirror surface. Because of these, the content thereof is preferably as high as possible. The lower limit of Li$_2$O content is 3%. Contents of Li$_2$O lower than 3% only result in a composition having a Young's modulus lower than 110 GPa. Such too low $Li_2O$ contents also result in insufficient strength of the glass composition because the amount of ions which are replaced in an ion-exchange treatment is insufficient.

On the other hand, when the content of $SiO_2$ is 40% or higher, the content of $Li_2O$ is preferably 5% or higher from the standpoint of avoiding a decrease in modulus of elasticity. Although $Li_2O$ is an ingredient having excellent properties as described above, it strongly tends to make the glass milk-white in glass compositions having a low $SiO_2$ content and a high $Al_2O_3$ content. Because of this, the upper limit of $Li_2O$ content is preferably 10%. Consequently, the content of $Li_2O$ in the glass composition should be from 3 to 10%, and is preferably from 5 to 10%.

$Na_2O$ is an essential component which, like $Li_2O$, undergoes ion replacement in an ion-exchange treatment. Although less effective than $Li_2O$ in improving modulus of elasticity, $Na_2O$ is superior in lowering the melting temperature and liquidus temperature of the glass to enhance meltability and in heightening the rate of mirror polishing. Especially when incorporated in a small amount (e.g., 0.1%), $Na_2O$ greatly heightens the stability of the glass. On the other hand, incorporation of $Na_2O$ in too large an amount (e.g., 10%) results in reduced contents of the other ingredients serving to improve modulus of elasticity. Consequently, the content of $Na_2O$ in the glass composition should be 5% or lower. In the case of a glass composition having a high $SiO_2$ content (40% or higher), the content of $Na_2O$ is preferably 2% or lower because of the necessity of heightening the contents of the other ingredients serving to improve modulus of elasticity as stated above. Consequently, the preferred range of $Na_2O$ content is from 0.1 to 5%, and the more preferred range thereof is from 0.1 to 2%.

In case where the total content of Li2O and $Na_2O$ ($R_2O$) in a glass is lower than 5%, this glass undergoes insufficient ion exchange and has poor meltability. On the other hand, in case where the total content thereof exceeds 12%, the glass is apt to be milk-white and suffer devitrification and is less apt to transparent. Consequently, the content of $R_2O$ in the glass composition is preferably from 5 to 12%.

Furthermore, in case where the proportion of $Li_2O$ to $R_2O$ ($Li_2O/(Li_2O+Na_2O)$) is smaller than 0.76, the glass has a reduced modulus of elasticity. However, in case where that proportion is 1, namely when the glass contains no $Na_2O$, the glass has impaired stability and the glass melt is apt to suffer devitrification upon cooling/solidification. Consequently, $Li_2O/(Li_2O+Na_2O)$ is preferably 0.76 or larger and should be 0.99 or smaller.

MgO is the most important essential component which serves as a network-modifying oxide in the glass. MgO is an ingredient which improves the modulus of elasticity of the glass, reduces the density thereof, accelerates batch melting, and enhances meltability. The higher the content of MgO, the more these functions are exhibited. However, MgO contents higher than a given value result in a glass melt which has an excessively reduced viscosity and undergoes devitrification upon cooling/solidification, making glass formation impossible. Because of this, the content of MgO should be 30% or lower. On the other hand, the lower limit of MgO content is determined while comparing the effect of improving modulus of elasticity with the effect of reducing glass density. Specifically, the lower limit thereof should be 15%. However, in the case of a glass composition having a high $SiO_2$ content (40% or higher), the content of MgO is desirably 20% or higher from the standpoint of maintaining a modulus of elasticity. Consequently, the content of MgO in the glass composition should be from 15 to 30%, and is preferably from 20 to 30%.

CaO is an optional component which, like MgO, improves modulus of elasticity and enhances batch meltability. Although superior to MgO in enhancing the devitrification resistance of a glass, CaO has a drawback that it slightly increases the density of the glass composition. Because of this, an increase in density and deterioration in devitrification resistance are taken in account in determining the content of CaO. Specifically, the content of CaO in the glass composition should be 10% or lower, and is preferably 6% or lower. On the other hand, the content of CaO is preferably 0.1% or higher because those effects are produced when CaO is incorporated even in a small amount.

SrO is an optional component which, like MgO and CaO, enhances batch meltability. When incorporated even in a small amount (e.g., 0.1%), SrO greatly improves the devitrification resistance of the glass. However, the content of SrO is regulated to a small value because SrO not only is less effective than MgO and CaO in improving the modulus of elasticity of the glass composition but considerably increases the density of the glass. In order to regulate the glass composition so as to have a density lower than 3.1 $g \cdot cm^{-3}$, the content of SrO should be regulated to 4% or lower. On the other hand, SrO is exceedingly superior to other components in the function of improving devitrification resistance. Since recovery of devitrification resistance is important especially in the presence of CaO, it is preferred that SrO be contained in an amount of at least 0.1%.

In case where the total content of all the bivalent-metal oxide components RO (RO=MgO+CaO+SrO) is lower than 25%, the glass composition frequently has a modulus of elasticity lower than 110 GPa and batch meltability is insufficient. As the content of RO increases, the modulus of elasticity increases. However, as the content thereof increases beyond 35%, the devitrification resistance of the glass abruptly becomes worse. In this case, the glass melt frequently suffers devitrification upon cooling/solidification, making it impossible to give a homogeneous glass. Consequently, the content of RO in the glass composition should be from 25 to 35%.

Furthermore, in case where the proportion of MgO to RO, i.e., MgO/(MgO+CaO+SrO), is smaller than 0.76, the glass composition has a reduced modulus of elasticity and an increased density. Consequently, the lower limit of MgO/(MgO+CaO+SrO) is preferably 0.76. On the other hand, MgO/(MgO+CaO+SrO) may be 1.00 because CaO and SrO are optional components. However, the upper limit thereof is preferably 0.99 in view of the excellent functions of CaO and SrO.

$TiO_2$ is an essential component which heightens the modulus of elasticity of the glass composition and improves the weatherability thereof. As apparent from the fact that a relatively large amount of $TiO_2$ is contained in milk-white glasses, $TiO_2$ has the function (side-effect) of making a glass milk-white. Because of this, the content thereof should be 10% or lower. On the other hand, the content thereof should be at least 2% from the standpoint of enabling the $TiO_2$ to fully perform its function of improving modulus of elasticity. In the case of a glass composition having a high $SiO_2$ content (40% or higher), the $TiO_2$ content is preferably 5% or higher from the standpoint of preventing a decrease in modulus of elasticity. Consequently, the content of $TiO_2$ in the glass composition should be from 2 to 10%, and is preferably from 5 to 10%.

$ZrO_2$ is an essential component which, like $TiO_2$, heightens the modulus of elasticity of the glass composition and improves the weatherability thereof. As apparent from the fact that $ZrO_2$ is used as a nucleating agent for crystallized glasses, $ZrO_2$ accelerates glass crystallization. $ZrO_2$ further has the function (side-effect) of increasing the density of the glass composition. Consequently, the content of $ZrO_2$ should be 4% or lower from the standpoint of avoiding unnecessary crystallization (devitrification) and an increase in density. On the other hand, from the standpoint of enabling those desirable functions to be fully performed, the content thereof should be 0.5% or higher and is preferably 1% or higher. Consequently, the content of $ZrO_2$ in the glass composition should be from 0.5 to 4%, and is preferably from 1 to 4%.

$TiO_2$ and $ZrO_2$, when coexistent with each other, produce a synergistic effect to greatly improve the modulus of elasticity of the glass composition. However, because of the undesirable functions (side-effects) of $TiO_2$ and $ZrO_2$, the glass composition is apt to suffer devitrification and to become milk-white when the total content of $TiO_2$ and $ZrO_2$ exceeds 12%. On the other hand, from the standpoint of enabling the synergistic effect of $TiO_2$ and $ZrO_2$ to be produced, the total content of $TiO_2$ and $ZrO_2$ should be 4% or higher and is preferably 6% or higher. Consequently, the total content of $TiO_2$ and $ZrO_2$ in the glass composition should be from 4 to 12%, and is desirably from 6 to 12%.

$Y_2O_3$ is an optional component which improves the modulus of elasticity of the glass composition and simultaneously increases the density thereof greatly. Since incorporation of $Y_2O_3$ necessitates use of an expensive raw glass material, the content of $Y_2O_3$ is preferably low from the standpoint of cost. In addition, as the content thereof increases beyond 4%, the function of improving modulus of elasticity decreases abruptly. Consequently, the content of $Y_2O_3$ in the glass composition should be 4% or lower.

Besides the components described above, other ingredients may be contained in a total amount of up to 3% for the purposes of coloring, melt clarification, etc. Examples of such optional ingredients include $As_2O_3$, $Sb_2O_3$, $SO_3$, $SnO_2$, $Fe_2O_3$, CoO, Cl, and F. There are cases where ingredients including $K_2O$ which are contained as impurities in minute amounts in industrially utilizable raw glass materials come into the glass composition. As long as the total content of these impurities is lower than 3%, they exert little influence on the properties of the glass composition and pose practically no problems.

When a glass composition comprises the components described above whose contents are within the respective ranges shown above, it has a modulus of elasticity of 110 GPa or higher, a density lower than 3.1 g/cm$^3$, and a specific modulus G satisfying the following relationship (1).

$$G \geq 9.36 \left\{ \sum_i U_i X_i / d_i \right\} \cdot \left\{ \sum_i V_i X_i \right\} / \left\{ \sum_i W_i X_i \right\} \quad (1)$$

In relationship (1), $U_i$ is the dissociation energy (energy required for decomposition into ions) for component i, and the unit thereof is kcal/mol; $X_i$ is the molar fraction of component i; $d_i$ is the density of component i, and the unit thereof is g/cm$^3$; and $V_i$ is that volume in the glass which is occupied by component i, a compound represented by the general formula $A_xO_y$, and which is represented by the following equation (2).

$$V_i = N_A 4/3\pi(xR_A^3 + yR_o^3) \quad (2)$$

In equation (2), NA is the constant called Avogadro's number ($6.022 \times 10^{23}$); $\pi$ is the ratio of the circumference of a circle to its diameter, i.e., 3.14; and $R_A$ and $R_O$ are the ionic radii of metal A and oxygen O, respectively. Values of $R_A$ and $R_o$ are reported, e.g., in L. Pauling, *Nature of Chemical Bond and Structure of Molecules and Crystals,* 3rd. ed., Cornell University Press, Ithaca, N.Y. (1960); R. D. Shannon, *Acta Crysta,* Vol.A32, p.751 (1976); and C. T. Prewitt, *Acta Crysta,* Vol.B25, p.925 (1969), and soon. The unit of $R_A$ and $R_o$ is angstrom. Furthermore, $W_i$ is the molecular weight of component i.

In relationship (1), the right side is calculated from known data for the components. As apparent from each of the Examples which will be given later, the calculated value well approximates to the specific modulus of the glass composition. Consequently, the specific modulus of a glass composition can be predicated by calculating the right side of relationship (1).

The glass composition satisfying relationship (1) has an exceedingly high specific modulus and can sufficiently have the performances required of next-generation substrates. Namely, the substrates made of this glass composition can attain a flying height of 10 nm. On the other hand, glass compositions not satisfying relationship (1) are ones which are apt to undergo devitrification or become milk-white and have poor formability or ones which have a low specific modulus, as will be described in Examples. Consequently, relationship (1) can be a good index to a judgement as to whether a glass composition is suitable for use as a substrate.

When the contents of components in a glass composition are further regulated to values within respective ranges specified above, the glass composition formed can have a modulus of elasticity of 110 GPa or higher, a density lower than 3.1 g/cm$^3$, and a specific modulus of 39.0 GPa·g$^{-1}$·cm$^3$ or higher. Furthermore, it has been ascertained, from Examples which will be given later, that modulus of elasticity, density, and specific modulus are improved to 124 GPa, 2.75 g/cm$^3$, and 41.2 GPa·g$^{-1}$·cm$^3$, respectively.

Since this glass composition contains $Li_2O$ and $Na_2O$, it can be chemically strengthened through an ion-exchange treatment. This ion-exchange treatment is accomplished by immersing the glass composition at a temperature not lower than the strain point thereof in a molten salt containing at least either of potassium ions and sodium ions. As a result of this chemical strengthening, a compression stress generates on the surface of the glass composition to improve the fracture strength thereof.

Furthermore, since this glass composition is a homogeneous transparent glass containing alkali components ($R_2O$) in a moderate amount, it can be mirror-polished with a general polishing technique for soda-lime glasses at a rate at least two times the rate of polishing for conventional high-modulus glasses. The polished mirror surface of this glass composition has high surface smoothness comparable to that of conventional high-modulus glasses.

Therefore, the substrate comprising this glass composition has a higher modulus of elasticity and a lower density than conventional substrates. Namely, the substrate has extraordinarily high specific modulus. Because of this, the substrate is less weighed down by itself and is less apt to suffer vibration caused by resonance. Furthermore, the substrate can be easily toughened by chemical strengthening and can be made to have high smoothness through polishing. This substrate can hence be easily mass-produced with conventional production apparatus. The recording medium containing this substrate also has high performances and can be mass-produced at low cost. The information recording device containing this recording medium has a high recording density and a reduced access time.

The invention will be explained below in more detail by reference to Examples and Comparative Examples. It should be understood that the invention is not construed as being limited thereto.

EXAMPLES 1 TO 24

Common raw glass materials including silica, alumina, lithium carbonate, sodium carbonate, magnesium oxide, calcium carbonate, potassium carbonate, strontium carbonate, titania, zirconia, and yttrium oxide were mixed together to prepare batches so as to result in the compositions shown in Table 1. Each batch prepared was held at 1,350° C. for 4 hours with a platinum crucible and then poured on an iron plate. After the pouring, the glass melt solidified in ten-odd seconds. This glass was held at 550° C. for 30 minutes in an electric furnace. Thereafter, the furnace was switched off to allow the glass to cool to room temperature. Thus, sample glasses were obtained.

The density, modulus of elasticity, and rate of polishing of each sample glass were measured or calculated in the following manners. The results obtained are shown in Table 1. Each sample glass was cut into a piece and each side thereof was subjected to mirror polishing to obtain a platy sample having dimensions of 10×30×30 mm. Each sample was examined for density by the Archimedes method. Furthermore, the modulus of elasticity of each sample was calculated by the ultrasonic pulse method (JIS R 1602-1986) using a sing-around oscillator.

The glasses of Examples 1 to 24 each had a Young's modulus higher than 110 GPa, a density lower than 3.1 g/cm$^3$, and a specific modulus of 39.0 GPa·g$^{-1}$·cm$^3$ or higher as shown in Table 1.

Subsequently, the rate of polishing was measured in each Example by the following method. Using an Oscar type polishing apparatus, the mirror surface of each of the platy samples used in the measurement of modulus of elasticity was polished for a given period with an abrasive fluid prepared by suspending an abrasive material comprising cerium oxide as the main component (trade name, Cerico SG; manufactured by Shin Nippon Kinzoku Kagaku Co., Ltd.) in water. From the resultant weight loss, the amount of the glass removed by the polishing per unit time was determined. A general soda-lime glass produced by the float process was also used to prepare therefrom a comparative sample, which was polished using the same abrasive fluid and the same polishing apparatus (Comparative Example 5). This value of rate of polishing for the comparative sample was used as a reference value to determine the rate of polishing for the glass of each Example as a relative value. The results obtained are shown in Table 1. As shown in Tables 1 and 2, the glasses of Examples 1 to 24 could be mirror-polished at a rate at least two times that of the conventional high-modulus glass compositions (Comparative Examples 7 and 8). Namely, these glasses according to the invention could be mirror-polished at a rate comparable to that of general soda-lime glasses. From a comparison among compositions given in Tables 1 and 2, it is thought that the presence of alkali components, especially Li$_2$O, contributed to an improvement in the rate of polishing.

Furthermore, the platy samples of Examples 1 to 24 were immersed for 3 hours in a melt of an 80:20 mixture of KNO$_3$ and NaNO$_3$ heated at 380° C. to chemically strengthen the glasses. Each strengthened glass was examined with a polarizing microscope to determine the thickness of the resultant compression stress layer. As a result, the strengthened platy samples each was ascertained to have a compression stress layer having a thickness as large as 50 μm or more. These results show that the glass compositions according to the invention each had a makeup suitable for chemical strengthening.

The sample glass of Example 1 was cut into a ring form having an outer diameter of 95 mm and an inner diameter of 25 mm. This disk was ground, polished, subsequently chemically strengthened under the same conditions as those shown above, and then subjected to mirror polishing (surface roughness $R_a$: ≦1 nm; JIS B 0601-1994) to form a substrate having a thickness of 0.8 mm.

Using this substrate, a recording medium was produced in the following manner. Chromium, Co—Cr—Ta, and carbon were deposited on the substrate as an undercoat layer, recording layer, and protective layer, respectively, by sputtering. A lubricating layer was further formed thereon to obtain a recording medium. This recording medium was set in a closed type magnetic-disk drive in an ordinary way and continuously rotated at a flying height of 15 nm and at a rotational speed of each of 10,000 rpm and 12,000 rpm. As a result, the recording medium was free from troubles such as magnetic head crushing at each rotational speed because of the high modulus of elasticity of the substrate.

Consequently, a glass composition having a low density and a high modulus of elasticity can be provided according to the invention. A glass composition capable of being mirror-polished with a conventional polishing technique at a rate at least two times that of conventional high-modulus glasses can also be provided. Furthermore, a substrate can be provided which comprises this glass composition and can be effectively inhibited from bending or resonating.

TABLE 1

| Example | 1 | 2 | 3 | 4 | 5 | 6 | 7 | 8 | 9 | 10 | 11 | 12 |
|---|---|---|---|---|---|---|---|---|---|---|---|---|
| SiO$_2$ (%) | 38.0 | 38.2 | 38.2 | 39.0 | 38.5 | 38.2 | 38.2 | 39.7 | 40.0 | 39.9 | 41.3 | 38.3 |
| Al$_2$O$_3$ (%) | 18.0 | 18.1 | 17.9 | 16.4 | 16.8 | 17.9 | 17.9 | 15.2 | 15.9 | 17.2 | 17.3 | 17.7 |
| Li$_2$O (%) | 5.3 | 5.3 | 5.1 | 5.7 | 5.4 | 5.1 | 6.1 | 5.4 | 9.3 | 5.4 | 5.5 | 8.9 |
| Na$_2$O (%) | 0.1 | 0.1 | 1.1 | 0.5 | 0.8 | 1.1 | 0.6 | 0.4 | 0.6 | 0.9 | 0.9 | 0.5 |
| MgO (%) | 27.5 | 28.1 | 28.5 | 23.5 | 27.7 | 27.5 | 27.1 | 24.6 | 21.3 | 23.7 | 26.0 | 23.1 |
| CaO (%) | 0.3 | 0.3 | 0.8 | 5.5 | 3.4 | 0.8 | 2.5 | 5.3 | 5.9 | 2.3 | 3.3 | 4.0 |
| SrO (%) | 0.1 | 0.1 | 0.4 | 0.6 | 1.0 | 0.4 | 0.7 | 0.2 | 0.3 | 0.7 | 0.1 | 2.0 |
| TiO$_2$ (%) | 9.1 | 8.2 | 4.8 | 6.3 | 3.5 | 5.8 | 3.0 | 6.0 | 3.1 | 7.1 | 2.0 | 3.0 |
| ZrO$_2$ (%) | 1.6 | 1.6 | 3.1 | 2.5 | 3.1 | 3.1 | 3.8 | 3.1 | 3.5 | 2.8 | 3.5 | 2.5 |
| Y$_2$O$_3$ (%) | 0 | 0 | 0 | 0 | 0 | 0 | 0 | 0 | 0 | 0 | 0 | 0 |

TABLE 1-continued

| | | | | | | | | | | | |
|---|---|---|---|---|---|---|---|---|---|---|---|
| MgO + CaO + SrO | 27.8 | 28.5 | 29.7 | 29.6 | 32.0 | 28.7 | 30.3 | 30.1 | 27.5 | 26.7 | 29.4 | 29.0 |
| Li$_2$O + Na$_2$O | 5.4 | 5.4 | 6.2 | 6.2 | 6.2 | 6.2 | 6.7 | 5.8 | 10.0 | 6.3 | 6.4 | 9.4 |
| MgO/RO | 0.99 | 0.99 | 0.96 | 0.79 | 0.86 | 0.96 | 0.89 | 0.82 | 0.78 | 0.89 | 0.88 | 0.80 |
| Ti + Zr | 10.8 | 9.8 | 7.9 | 8.8 | 6.6 | 8.9 | 6.9 | 9.1 | 6.6 | 9.9 | 5.6 | 5.5 |
| Al$_2$O$_3$/R$_2$O | 3.36 | 3.36 | 2.89 | 2.64 | 2.72 | 2.89 | 2.65 | 2.61 | 1.60 | 2.73 | 2.68 | 1.87 |
| Li$_2$O/R$_2$O | 0.98 | 0.98 | 0.82 | 0.92 | 0.87 | 0.82 | 0.90 | 0.93 | 0.94 | 0.85 | 0.86 | 0.95 |
| Density (g/cm$^3$) | 2.85 | 2.83 | 2.85 | 2.86 | 2.86 | 2.86 | 2.87 | 2.87 | 2.83 | 2.86 | 2.81 | 2.83 |
| Modulus of elasticity (GPa) | 118 | 117 | 115 | 115 | 115 | 115 | 115 | 114 | 114 | 114 | 113 | 112 |
| Specific modulus (*1) | 41.2 | 41.2 | 40.5 | 40.2 | 40.3 | 40.2 | 39.9 | 39.8 | 40.4 | 39.7 | 40.2 | 39.8 |
| Right side of relationship (1) | 40.2 | 40.2 | 39.4 | 38.6 | 38.6 | 39.4 | 39.1 | 38.3 | 38.6 | 38.9 | 39.1 | 38.8 |
| Rate of polishing (*2) | 0.5 | 0.5 | 0.4 | 0.5 | 0.6 | 0.4 | 0.5 | 0.6 | 0.6 | 0.4 | 0.6 | 0.6 |
| Glass property | transparent | transparent | transparent | transparent | transparent | transparent | transparent | transparent | transparent | transparent | transparent | transparent |

| Example | 13 | 14 | 15 | 16 | 17 | 18 | 19 | 20 | 21 | 22 | 23 | 24 |
|---|---|---|---|---|---|---|---|---|---|---|---|---|
| SiO$_2$ (%) | 40.8 | 40.2 | 40.8 | 41.3 | 39.7 | 41.6 | 39.6 | 40.3 | 36.7 | 37.4 | 37.7 | 38.1 |
| Al$_2$O$_3$ (%) | 15.2 | 16.9 | 16.1 | 15.6 | 15.1 | 15.1 | 19.1 | 17.5 | 17.4 | 17.8 | 16.5 | 16.6 |
| Li$_2$O (%) | 7.3 | 5.9 | 5.5 | 6.6 | 8.2 | 7.1 | 9.6 | 5.7 | 5.1 | 5.2 | 5.3 | 5.4 |
| Na$_2$O (%) | 0.8 | 0.5 | 1.5 | 0.7 | 2.0 | 1.3 | 1.0 | 1.7 | 0.1 | 0.1 | 0.8 | 0.8 |
| MgO (%) | 25.4 | 24.3 | 24.6 | 23.2 | 23.5 | 20.8 | 23.3 | 22.7 | 28.0 | 28.6 | 27.1 | 27.4 |
| CaO (%) | 4.4 | 5.7 | 3.4 | 4.5 | 4.1 | 5.5 | 1.1 | 4.9 | 0.3 | 0.3 | 3.3 | 3.3 |
| SrO (%) | 1.4 | 0.6 | 1.8 | 1.9 | 1.3 | 1.3 | 0.8 | 1.5 | 0.1 | 0.1 | 0.9 | 1.0 |
| TiO$_2$ (%) | 2.3 | 3.2 | 2.8 | 3.1 | 3.8 | 3.9 | 3.8 | 3.7 | 6.9 | 7.0 | 3.4 | 3.5 |
| ZrO$_2$ (%) | 2.5 | 2.6 | 3.5 | 3.0 | 2.4 | 3.4 | 1.8 | 3.1 | 1.5 | 1.6 | 3.1 | 3.1 |
| Y$_2$O$_3$ (%) | 0 | 0 | 0 | 0 | 0 | 0 | 0 | 0 | 3.8 | 2.0 | 2.0 | 1.0 |
| MgO + CaO + SrO | 31.1 | 30.6 | 29.8 | 29.7 | 28.9 | 27.6 | 25.2 | 29.1 | 28.3 | 28.9 | 31.3 | 31.7 |
| Li$_2$O + Na$_2$O | 0.1 | 6.4 | 7.1 | 7.3 | 10.2 | 8.3 | 10.6 | 7.4 | 5.2 | 5.3 | 6.1 | 6.1 |
| MgO/RO | 0.82 | 5.9 | 6.3 | 6.1 | 6.1 | 7.3 | 5.6 | 5.8 | 8.5 | 8.6 | 6.5 | 6.5 |
| Ti + Zr | 4.8 | 5.9 | 6.3 | 6.1 | 6.1 | 7.3 | 5.6 | 5.8 | 8.5 | 8.6 | 6.5 | 6.5 |
| Al$_2$O$_3$/R$_2$O | 1.87 | 2.64 | 2.28 | 2.13 | 1.49 | 1.81 | 1.80 | 2.36 | 3.36 | 2.72 | 2.72 | |
| Li$_2$O/R$_2$O | 0.90 | 0.92 | 0.79 | 0.90 | 0.80 | 0.85 | 0.90 | 0.77 | 0.98 | 0.98 | 0.87 | 0.87 |
| Density (g/cm$^3$) | 2.83 | 2.83 | 2.86 | 2.85 | 2.82 | 2.84 | 2.75 | 2.81 | 3.06 | 2.94 | 2.97 | 2.92 |
| Modulus of elasticity (GPa) | 112 | 112 | 111 | 111 | 111 | 111 | 110 | 110 | 124 | 120 | 118 | 116 |
| Specific modulus (*1) | 39.6 | 39.5 | 39.0 | 39.1 | 39.4 | 39.0 | 40.1 | 39.2 | 40.4 | 40.8 | 39.6 | 39.8 |
| Right side of relationship (1) | 38.1 | 38.7 | 37.8 | 37.8 | 38.0 | 37.6 | 40.1 | 38.4 | 37.6 | 38.8 | 37.4 | 38.0 |
| Rate of polishing (*2) | 0.7 | 0.6 | 0.8 | 0.7 | 0.7 | 0.8 | 0.6 | 0.6 | 0.5 | 0.7 | 0.7 | 0.6 |
| Glass property | transparent | transparent | transparent | transparent | transparent | transparent | transparent | transparent | transparent | transparent | transparent | transparent |

*1: GPa · g$^{-1}$ · cm$^3$
*2: Relative rate of polishing with general soda-lime composition (Comparative Example 5) as a reference.

COMPARATIVE EXAMPLES 1 TO 8

Sample glasses were prepared so as to result in the compositions shown in Table 2 given below, in the same manner as in the Examples. In Comparative Examples 6 to 8, however, each batch prepared was held at 1,600° C. for 16 hours with a platinum crucible and then poured on an iron plate. This glass was held at 650° C. for 30 minutes in an electric furnace. Thereafter, the furnace was switched off to allow the glass to cool to room temperature to obtain a sample glass.

The density, modulus of elasticity, and rate of polishing of each of these sample glasses were measured or calculated in the same manners as in the Examples. The results obtained are shown in Table 2.

In Comparative Examples 1 and 3, the measurements of density and modulus of elasticity were not made because the samples suffered devitrification during glass melt cooling and a homogeneous glass was not obtained. In Comparative Example 2, the sample glass was milk-white and had a modulus of elasticity as low as 103 GPa, although it had not undergone devitrification. In Comparative Examples 4 to 6, transparent homogeneous glasses were obtained but their moduli of elasticity were 102 GPa or lower. The glass of Comparative Example 5 is a general soda-lime glass and was used as a reference for determining the relative rate of polishing. In Comparative Example 7, a transparent homogeneous glass was obtained, which had a modulus of elasticity as high as 119 GPa. However, the specific modulus of this glass was 37.9 GPa·g$^{-1}$·cm$^3$ because the density thereof was as high as 3.14 g/cm$^3$. In addition, this glass had a rate of polishing about one-tenth that of the general soda-lime glass and was exceedingly difficult to polish. In Comparative Example 8, a transparent homogeneous glass was obtained, which had a modulus of elasticity of 112 GPa and a density of 3.04 g/m$^3$. However, this glass had a specific modulus as low as 37.1 GPa·g$^{-1}$·cm$^3$ and did not satisfy relationship (1). The relative rate of polishing of this glass was one-tenth that of the general soda-lime glass, showing that this glass was difficult to mirror-polish.

Comparative Examples 6, 7, and 8 correspond to the Example 18 given in International Publication WO 98/09922, the Example 1 given in JP-A-10-81542, and the Example 35 given in JP-A-10-79122, respectively.

The glasses of Comparative Examples 5 to 8 were subjected to chemical strengthening. In Comparative Example 5, the glass was immersed for 3 hours in a melt of KNO$_3$ heated at 380° C. However, the treated glass of Comparative Example 5 had a compression stress layer thickness of 11 μm, which was far smaller than the thicknesses of 50 μpm or larger in the Examples, although the chemical strengthening had been conducted for a longer period than in the Examples. In Comparative Examples 6 to 8, each glass was immersed for 4 hours in a melt of KNO$_3$ heated at 380° C. Thereafter, a section of each of these glasses was examined with a polarizing microscope in the same manner as in the Examples. However, a compression stress layer was not observed in the thus-treated glasses, showing that chemical strengthening did not occur. This is probably because the glasses of Comparative Examples 6 to 8 contained no alkali components capable of undergoing replacement with potassium ions in the KNO$_3$ melt.

TABLE 2

| Comparative Example | 1 | 2 | 3 | 4 | 5 | 6 | 7 | 8 |
|---|---|---|---|---|---|---|---|---|
| SiO$_2$ (%) | 39.2 | 41.9 | 37.5 | 46.0 | 71.6 | 50.0 | 40.0 | 35.0 |
| Al$_2$O$_3$ (%) | 24.2 | 16.3 | 16.0 | 20.0 | 0.9 | 15.0 | 15.0 | 33.0 |
| Li$_2$O (%) | 9.9 | 13.0 | 9.0 | 5.0 | 0 | 0 | 0 | 0 |
| Na$_2$O (%) | 2.8 | 2.1 | 0 | 10.0 | 12.7 | 0 | 0 | 0 |
| K$_2$O (%) | 0 | 0 | 0 | 0 | 0.5 | 0 | 0 | 0 |
| MgO (%) | 11.4 | 11.4 | 27.5 | 5.0 | 6.0 | 15.0 | 25.0 | 0 |
| CaO (%) | 0.6 | 6.2 | 0 | 12.0 | 8.4 | 20.0 | 10.0 | 25.0 |
| SrO (%) | 2.7 | 0.4 | 0 | 2.0 | 0 | 0 | 0 | 0 |
| TiO$_2$ (%) | 4.8 | 6.8 | 7.0 | 0 | 0 | 0 | 5.0 | 2.0 |
| ZrO$_2$ (%) | 4.5 | 1.9 | 3.0 | 0 | 0 | 0 | 0 | 0 |
| Y$_2$O$_3$ (%) | 0 | 0 | 0 | 0 | 0 | 0 | 5.0 | 5.0 |
| MgO + CaO + SrO | 14.6 | 18.0 | 27.5 | 19.0 | 14.4 | 35.0 | 35.0 | 25.0 |
| Li$_2$O + Na$_2$O | 12.7 | 15.1 | 9.0 | 15.0 | 13.2 | 0 | 0 | 0 |
| MgO/RO | 0.8 | 0.6 | 1.0 | 0.3 | 0.4 | 0.4 | 0.7 | 0 |
| Ti + Zr | 9.3 | 8.7 | 10.0 | 0 | 0 | 0 | 5.0 | 2.0 |
| Al$_2$O$_3$/R$_2$O | 1.91 | 1.08 | 0.58 | 1.11 | 0.06 | 0.43 | 0.43 | 1.32 |
| Li$_2$O/R$_2$O | 0.78 | 0.86 | 1.00 | 0.33 | 0 | — | — | — |
| Density (g/cm$^3$) | — | 2.74 | — | 2.67 | 2.50 | 2.75 | 3.14 | 3.03 |
| Modulus of elasticity (GPa) | — | 103 | — | 90 | 72 | 102 | 119 | 112 |
| Specific modulus (*1) | — | 37.7 | — | 33.7 | 28.8 | 37.1 | 37.9 | 37.1 |
| Right side of relationship (1) | 39.6 | 38.7 | 39.7 | 36.2 | 30.6 | 36.8 | 35.2 | 38.4 |
| Rate of polishing (*2) | — | — | — | — | 1.0 | 0.2 | 0.1 | 0.1 |
| Glass property | devitrified | milk-white | devitrified | transparent | transparent | transparent | transparent | transparent |

*1: GPa · g$^{-1}$ · cm$^3$
*2: Relative rate of polishing with general soda-lime composition (Comparative Example 5) as a reference.

As described above in detail, the following effects are brought about by the invention.

Since the glass composition of the invention comprises components whose contents are within respective appropriate ranges, it has a high modulus of elasticity and a low density, i.e., has a high specific modulus, and can be provided at low cost.

In one preferred embodiment of the invention, since the content of each of $SiO_2$, $TiO_2$, $ZrO_2$, and $TiO_2+ZrO_2$ is within a narrower range in the preferred range, the glass composition can have a modulus of elasticity of 110 GPa or higher without fail.

In another preferred embodiment of the invention, since the content of $SiO_2$ is within an even narrower range in the preferred range, the preferred ranges of the contents of other components can be widened and the glass composition can be easily made to have a higher modulus of elasticity and a lower density, i.e., to have a higher specific modulus.

In still another preferred embodiment of the invention, since the proportion of $Li_2O$ to $(Li_2O+Na_2O)$ is from 0.76 to 0.99, the glass composition can be made to have an even higher modulus of elasticity while preventing devitrification during glass melt cooling/solidification.

In a further preferred embodiment of the invention, since the proportion of MgO to (MgO+CaO+SrO) is from 0.76 to 1.00, the glass composition can have a modulus of elasticity of 110 GPa or higher without fail.

In still a further preferred embodiment of the invention, since the proportion of $Al_2O_3$ to $(Li_2O+Na_2O)$ is from 1.5 to 4.0, the glass can be effectively prevented from becoming milk-white or suffering devitrification.

In still a further preferred embodiment of the invention, since the glass composition has a modulus of elasticity of 110 GPa or higher and a density lower than 3.1 g/cm³ and satisfies relationship (1), whether or not the glass composition is suitable for use as a substrate can be easily predicted.

In still a further preferred embodiment of the invention, since the glass composition has a modulus of elasticity of 110 GPa or higher, a density lower than 3.1 g/cm³, and a specific modulus G of 39.0 GPa·g⁻¹cm³ or higher, it can sufficiently have performances required of next-generation substrates.

In still a further preferred embodiment of the invention, since the glass composition has undergone an ion-exchange treatment in a molten salt containing at least either of potassium ions and sodium ions, it can have a further heightened strength.

The substrate of the invention can sufficiently meet performance requirements of the next generation because it comprises the glass composition.

The recording medium of the invention can be produced with conventional production facilities and be provided as an inexpensive high-performance recording medium, because it employs the substrate.

The information recording device of the invention has a large recording capacity and a short access time and can be provided at low cost, because it employs the recording medium.

What is claimed is:

1. A glass composition comprising, in terms of mol %,
   35 to 45% silicon dioxide ($SiO_2$),
   15 to 20% aluminum oxide ($Al_2O_3$),
   3 to 10% lithium oxide ($Li_2O$),
   0.1 to 5% sodium oxide ($Na_2O$),
   15 to 30% magnesium oxide (MgO),
   0 to 10% calcium oxide (CaO),
   0 to 4% strontium oxide (SrO),
   25 to 35% RO (MgO+CaO+SrO),
   2 to 10% titanium dioxide ($TiO_2$),
   0.5 to 4% zirconium oxide ($ZrO_2$),
   4 to 12% $TiO_2+ZrO_2$, and
   0 to 4% yttrium oxide ($Y_2O_3$).

2. A glass composition comprising, in terms of mol %,
   35 to 42% silicon dioxide ($SiO_2$),
   15 to 20% aluminum oxide ($Al_2O_3$),
   5 to 10% lithium oxide ($Li_2O$),
   0.1 to 2% sodium oxide ($Na_2O$),
   20 to 30% magnesium oxide (MgO),
   0 to 10% calcium oxide (CaO),
   0 to 4% strontium oxide (SrO),
   25 to 35% RO (MgO+CaO+SrO),
   5 to 10% titanium dioxide ($TiO_2$),
   1 to 4% zirconium oxide ($ZrO_2$),
   6 to 12% $TiO_2+ZrO_2$, and
   0 to 4% yttrium oxide ($Y_2O_3$).

3. A glass composition comprising, in terms of mol %,
   35 to 40% silicon dioxide ($SiO_2$),
   15 to 20% aluminum oxide ($Al_2O_3$),
   3 to 10% lithium oxide ($Li_2O$),
   0.1 to 5% sodium oxide ($Na_2O$),
   15 to 30% magnesium oxide (MgO),
   0 to 10% calcium oxide (CaO),
   0 to 4% strontium oxide (SrO),
   25 to 35% RO (MgO+CaO+SrO),
   2 to 10% titanium dioxide ($TiO_2$),
   1 to 4% zirconium oxide ($ZrO_2$),
   4 to 12% $TiO_2+ZrO_2$, and
   0 to 4% yttrium oxide ($Y_2O_3$).

4. The glass composition of claim 1, 2 or 3, wherein the ratio of the content of $Li_2O$ to that of $(Li_2O+Na_2O)$ is from 0.76 to 0.99.

5. The glass composition of claim 1, 2 or 3, wherein the ratio of the content of MgO to that of (MgO+CaO+SrO) is from 0.76 to 1.00.

6. The glass composition of claim 1, 2 or 3, wherein the ratio of the content of $Li_2O$ to that of $(Li_2O+Na_2O)$ is from 0.76 to 0.99, and the ratio of the content of MgO to that of (MgO+CaO+SrO) is from 0.76 to 1.00.

7. The glass composition of claim 6, which has a modulus of elasticity as represented by Young's modulus of 110 GPa or higher and a density lower than 3.1 g/cm³ and in which the specific modulus G as determined by dividing the modulus of elasticity by the density thereof is 39.0 GPa·g⁻¹·cm³ or higher.

8. The glass composition of claim 7, which had undergone ion-exchange treatment in a molten salt containing at least either of potassium ions or sodium ions.

9. The glass composition of claim 1, 2 or 3, wherein the ratio of the content of $Al_2O_3$ to that of $(Li_2O+Na_2O)$ is from 1.5 to 4.0.

10. The glass composition of claim 1, 2 or 3, wherein the ratio of the content of $Li_2O$ to that of $(Li_2O+Na_2O)$ is from 0.76 to 0.99, the ratio of the content of MgO to that of (MgO+CaO+SrO) is from 0.76 to 1.00, and the ratio of the content of $Al_2O_3$ to that of $(Li_2O+Na_2O)$ is from 1.5 to 4.0.

11. The glass composition of claim 10, which has a modulus of elasticity as represented by Young's modulus of 110 GPa or higher and a density lower than 3.1 g/cm$^3$ and in which the specific modulus G as determined by dividing the modulus of elasticity by the density thereof is 39.0 GPa·g$^{-1}$·cm$^3$ or higher.

12. The glass composition of claim 11, which has undergone an ion-exchange treatment in a molten salt containing at least either of potassium ions and sodium ions.

13. A substrate for information recording media which comprises the glass composition of claim 12.

14. An information recording medium comprising the substrate for information recording media of claim 13.

15. An information recording device comprising the information recording medium of claim 14.

16. The glass composition of claim 1, 2, or 3, which has a modulus of elasticity, as represented by Young's modulus, of 110 GPa or higher and a density lower than 3.1 g/cm$^3$, and in which the specific modulus G, as determined by dividing the modulus of elasticity by the density thereof, satisfies the following relationship (1):

$$G \geq 9.36 \left\{ \sum_i U_i X_i / d_i \right\} \cdot \left\{ \sum_i V_i X_i \right\} / \left\{ \sum_i W_i X_i \right\}. \tag{1}$$

17. The glass composition of claim 16, which has undergone an ion-exchange treatment in a molten salt containing at least either of potassium ions and sodium ions.

18. A substrate for information recording media which comprises the glass composition of claim 17.

19. An information recording medium comprising the substrate for information recording media of claim 18.

20. An information recording device comprising the information recording medium of claim 19.

* * * * *